United States Patent [19]

Kirchberg, Jr.

[11] Patent Number: 4,961,130
[45] Date of Patent: Oct. 2, 1990

[54] VOLTAGE INVERTER CONTROL APPLYING REAL-TIME ANGLE PATTERN DETERMINATION

[75] Inventor: Maurice A. Kirchberg, Jr., Dubuque, Iowa

[73] Assignee: Sundstrand Corporation, Rockford, Ill.

[21] Appl. No.: 448,663

[22] Filed: Dec. 11, 1989

[51] Int. Cl.⁵ .............................................. H02M 1/12
[52] U.S. Cl. ........................................ 363/41; 363/37; 363/79; 363/98; 364/726; 318/802; 318/811
[58] Field of Search ..................... 363/37, 41, 78, 79, 363/95, 98; 364/483, 726; 318/800, 801, 802, 811

[56] References Cited

U.S. PATENT DOCUMENTS

| | | | |
|---|---|---|---|
| 3,971,972 | 7/1976 | Stich | 363/41 |
| 4,387,421 | 6/1983 | Zach et al. | 363/41 |
| 4,480,299 | 10/1984 | Muto et al. | 318/811 |
| 4,527,226 | 7/1985 | Glennon | 363/41 |
| 4,595,976 | 6/1986 | Parro, II | 363/98 |
| 4,615,000 | 9/1986 | Fujii et al. | 318/811 |
| 4,635,177 | 1/1987 | Shekhawat et al. | 363/98 |
| 4,757,434 | 7/1988 | Kawabata et al. | 363/41 |
| 4,807,103 | 2/1989 | Uesugi | 363/41 |
| 4,862,343 | 8/1989 | Nomura et al. | 363/37 |

Primary Examiner—Peter S. Wong
Attorney, Agent, or Firm—Whitham & Marhoefer

[57] ABSTRACT

A PWM inverter takes into account the harmonic distortion produced by a d.c. link which is not constant. The controller determines switching angles in real time eliminating the need for storing PWM patterns in ROM. This is made possible by a "quick" Fourier transform which allows the determination of switching events in a PWM inverter in real time. The inverter controller develops pattern sets for rejecting selected harmonics and accounts for known fixed harmonic distortion on the d.c. link by determining the set of switching angles for each controlled selected harmonic.

10 Claims, 5 Drawing Sheets

VOLTAGE INVERTER CONTROL APPLYING REAL-TIME ANGLE PATTERN DETERMINATION

BACKGROUND OF THE INVENTION

1. Field of the Invention

The present invention generally relates to pulse width modulated (PWM) inverters and, more particularly, to an inverter control which generates in real-time pattern sets that reject selected harmonics and account for known fixed harmonic distortion on a direct current (d.c.) voltage link. A particular feature of the invention is the use of a "quick" Fourier transform algorithm for the real-time pattern selection.

2. Description of the Prior Art

PWM inverters are employed to convert direct current (d.c.) to alternating current (a.c.). In many applications, it is important to carefully regulate the quality of the a.c. generated by the inverter. Accordingly, it is customary to define a point of regulation (POR) downstream of the inverter at which the voltage and current of the a.c. signal generated by the inverter is sampled. The sampled voltage and current are used to select appropriate PWM switching patterns to minimize distortion at the POR. Based on the voltage and current sensed at the POR, an inverter controller selects or creates in real time an appropriate PWM pattern to ensure the least distortion at the POR. Obviously, as real and reactive power factors of electrical loads coupled to the inverter change, the PWM patterns fed to the inverter change.

A PWM pattern comprises a set of switching transients which, when applied to a d.c. signal via an inverter, produces alternating pulses which, when filtered, approximates a sinusoidal a.c. signal. The pulses in a PWM pattern are of varying width. Normally, the inverter control can be adjusted so that the inverter adequately reproduces the PWM pattern under a single operational condition and thereby creates an accurate approximation of a sinusoidal a.c. signal from the d.c. voltage. However, under other load conditions (particularly when loads are unbalanced or have particular real or reactive power components), the inverter controller selects a PWM pattern which has switching transients defining pulses which will not be faithfully reproduced by the inverter due to physical limitations of the transistor switches and their dependence upon operating conditions. In other words, the transistor switches within the inverter have physical limitations which manifest themselves, among other ways, in a minimum allowable switching time and delays in following switching commands. Thus, should the inverter switch be called upon to switch faster than it is able, it will be unable to do so and therefore will be unable to faithfully reproduce a part of the PWM pattern required to maintain the least distortion at the POR. Accordingly, under some conditions, the POR distortion cannot be regulated due to physical limitations of the transistor switches in the inverter.

Prior inventions have addressed schemes for controlling current and voltage at the POR. Representative of such inventions is U.S. Pat. No. 4,527,226 to Glennon which discloses an inverter control system for a PWM inverter circuit. This circuit comprises an angle set look up table and selection logic for addressing the look up table. The, angle set defining the inverter output waveform is selected in response to various operating conditions of the inverter.

U.S. Pat. No. 4,595,976 to Parro, II discloses an inverter control which is an enhancement of the Glennon inverter control. More specifically, the table look up is implemented as a plurality of memories, one for each phase, each of which is subdivided into a plurality of memory blocks which store a number of bytes. Memory address decoding logic addresses a particular memory block in each memory in accordance with a control signal representing the desired waveform to be generated at each phase output. Thus, the Parro, II inverter control accomplishes individual phase regulation of the inverter output.

U.S. Pat. No. 4,635,177 to Shekhawat et al. discloses a further refinement of the basic Glennon inverter control system. More specifically, the Shekhawat et al. control permits on-line generation of PWM patterns for a neutral point clamped PWM inverter. A microprocessor and memory are coupled to the generating circuitry for calculating switching points for the inverter switches during operation of the inverter. Timer modules are coupled to the microprocessor for developing switch points so that the switches are operated to reduce the distortion of the inverter output signal.

U.S. Pat. No. 4,480,299 to Muto et al. also discloses a microprocessor controlled inverter control. However, the Muto et al. PWM inverter is controlled by the use of the fundamental wave voltage of the inverter output as a feedback quantity. Muto et al. fail to show any apparatus for directly dealing with the physical limitations within the inverter itself.

U.S. Pat. No. 4,807,103 to Uesugi discloses a controller for a PWM controlled inverter which comprises a read only memory (ROM) that stores instantaneous output voltage and duration data. The ROM is addressed by an address counter which advances in response to an electrical angle counter. The data read out of the ROM is supplied to a waveform shaping circuit which generates the drive signals for the inverter switches. The data in the ROM is minimized by avoiding the necessity of writing the same data in a plurality of addresses.

The state of the art analysis for the control of selected harmonic content of PWM inverter output as represented by the foregoing patents assumes a "stiff link"; i.e., a constant, unvarying d.c. voltage and unvarying switch performance. In many applications, and particularly for applications in aircraft, such an assumption is not justified. In practice, the variation of the d.c. link and switching performance changes cause serious harmonic distortion that needs to be addressed.

SUMMARY OF THE INVENTION

It is therefore an object of the present invention to provide an improved control for a PWM inverter which takes into account the harmonic distortion produced by an inverter which is not constant.

It is another object of the invention to provide a controller which determines switching angles in real time reducing the need for storing an extensive range of PWM patterns in ROM.

It is another, more specific object of the invention to provide a "quick" Fourier transform which allows the determination of switching events in a PWM inverter in real time.

According to the invention, there is provided a controller for a PWM inverter which develops pattern sets for rejecting selected harmonics and accounts for known fixed harmonic distortion on the d.c. link. The controller determines the set of switching angles in real time rather than storing PWM patterns in ROM. For each controlled selected harmonic, an association is made with that harmonic to one angle of the angle set in the following manner. For example, the highest frequency may be associated with the angle preceding the shortest switching interval and so forth until the lowest controlled harmonic is associated with the angle preceding the longest switching interval. The actual association must be selected considering the sensitivity of the harmonic amplitudes to movement of the angles. This ensures feedback of the correct polarity and optimum control loop performance.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
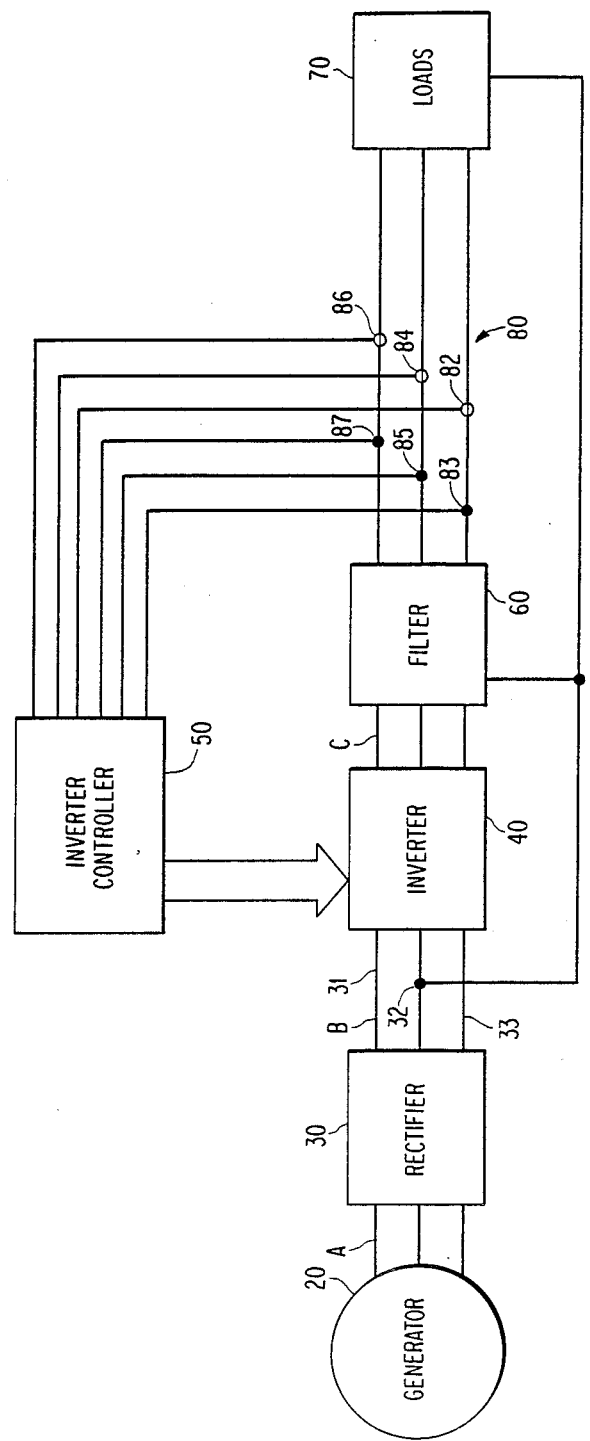
FIG. 1 is a block diagram of a variable speed constant frequency system embodying the invention.

Referring now to the drawings, and more particularly to FIG. 1, there is shown a block diagram of the variable speed constant frequency (VSCF) system embodying the present invention. A generator 20 is mechanically coupled to a variable speed prime mover (not shown) which may be, for example, an aircraft engine. The generator 20 produces power of a frequency which varies as a function of the speed of the prime mover. The resulting a.c. power produced by the generator 20 is therefore termed "wild frequency" a.c. power and is generally undesirable for use by aircraft electrical systems or loads, which is the preferred environment for the operation of the VSCF system.

Accordingly, the VSCF system is designed to convert the wild frequency a.c. power produced by the generator 20 into constant frequency a.c. power, typically at a frequency of 400 Hz, for use by aircraft electrical systems. Wild frequency a.c. power produced by the generator 20 is fed to a rectifier 30 which rectifies the a.c. power into positive and negative d.c. voltages. The d.c. voltages are produced on a d.c. link having a positive d.c. rail 31 and a negative d.c. rail 33. An inverter 40, under control of an inverter controller 50 produces, by pulse width modulation in the preferred embodiment, a PWM waveform from the d.c. voltages which is fed to the filter 60. The filter 60 smooths the PWM waveform produced by the inverter 40 into an approximation of a sinusoidal constant frequency a.c. output which is fed to the aircraft electrical loads 70.

In the preferred embodiment of the invention, the wild a.c. power output by the generator 20 is three phase a.c. power. The constant frequency a.c. power generated by the inverter 40 and smoothed by the filter 60 is likewise three phase. In the preferred embodiment of the invention, the inverter is provided with a neutral line 32 from the rectifier 30, which is also coupled to the filter 60 and loads 70.

Figure 2:
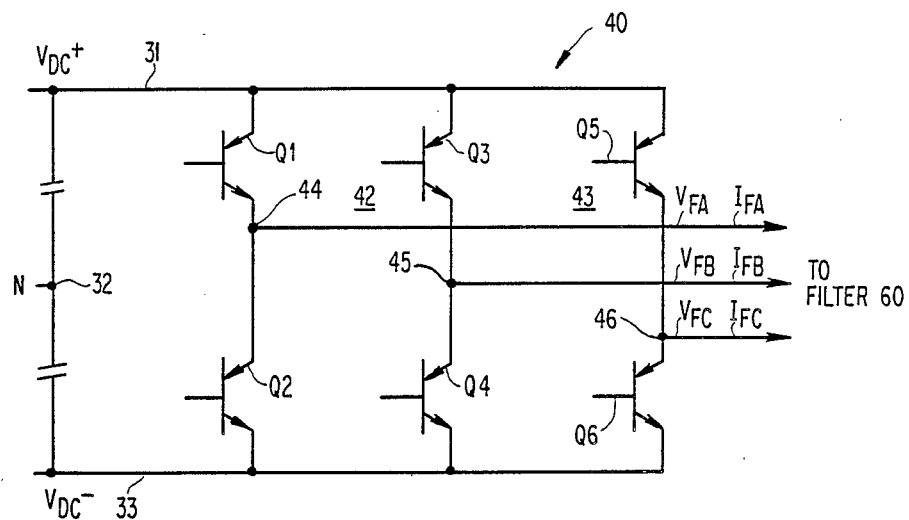
FIG. 2 is a simplified block and schematic diagram of a typical three-phase inverter.

Referring to FIG. 2, the inverter 40 includes three inverter legs 41, 42 and 43, each comprising two controllable power switches, such as switches $Q_1$ and $Q_2$, which are connected in series across the positive and negative d.c. rails 31 and 33.

Referring specifically to the inverter leg 41 as an example, the switches $Q_1$ and $Q_2$ are operated in accordance with a PWM waveform pattern developed by the inverter controller 50 to produce a PWM output voltage $V_{FA}$ and current $I_{FA}$ at the junction 44. Likewise, phase outputs $V_{FB}$, $I_{FB}$ and $V_{FC}$, $I_{FC}$ are produced at the junctions 45 and 46, respectively, by operation of the switches $Q_3$, $Q_4$ and $Q_5$, $Q_6$ in the inverter legs 42 and 43.

Referring back to FIG. 1, the inverter controller 50 is controlled in response to signals sensed from a point of regulation (POR), indicated generally as 80, which is located downstream of the filter 60. Current is sensed by use of current transformers 82, 84 and 86 which sense each of the three phases produced by the filter 60, respectively. Likewise, voltages are sensed by taps 83, 85 and 87 applied to each of the three phases produced by the filter 60. Each of the signals appearing at the current transformers 82, 84 and 86 and taps 83, 85 and 87 is fed to the inverter controller 50 and is used to select or generate an appropriate PWM switching pattern. Depending on the real or reactive components of the power requirements of the loads 70, the inverter controller 50 selects from memory or creates in real time a PWM pattern which, when supplied to the inverter 40 and filtered by the filter 60, produces an approximate sinusoidal a.c. output waveform which is optimized to have the least distortion at the POR 80.

Figure 3:
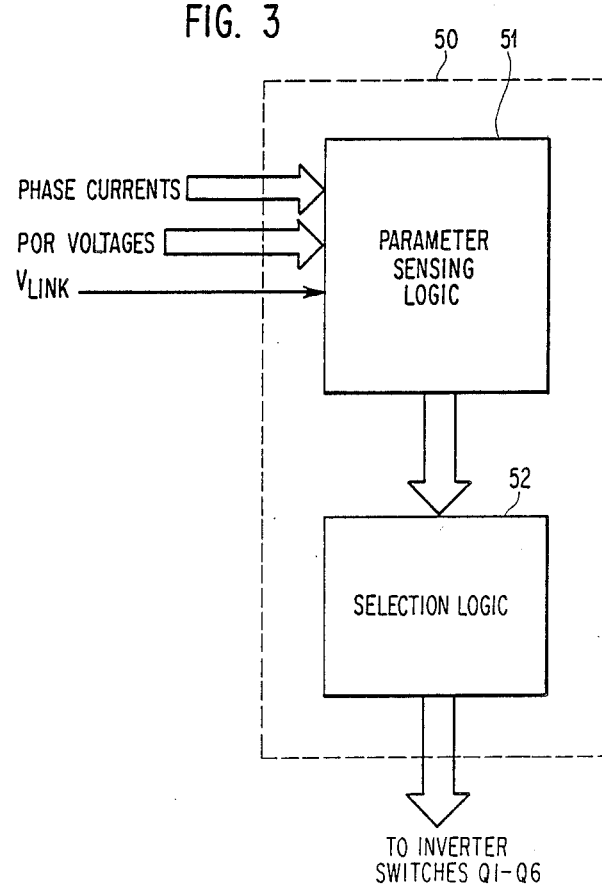
FIG. 3 is a simplified block diagram of the inverter controller shown in FIG. 1.

Referring now to FIG. 3, there is illustrated in block diagram form the inverter control 50 shown in FIG. 1. The inverter control 50 develops operating signals for switches in inverter 40 to produce one of a plurality of PWM outputs in accordance with the sensed parameters. The inverter control 50 includes parameter sensing logic 51 which senses the various operating parameters of the inverter, including the currents developed in each of the phase outputs of the inverter, the phase voltages at the POR and the voltage across the d.c. links 31 and 33. The sensing logic 51 may take the form disclosed, for example, in the aforementioned U.S. Pat. No. 4,527,226 to Glennon. The parameter sensing logic 51 generates outputs to the angle set generator 52 which generates phase control waveforms which are utilized to control the inverter switches $Q_1$ to $Q_6$. Thus, the generator 52 generates phase control waveforms which are utilized to control the inverter 40.

Referring back to FIG. 1 once again, the PWM switching pattern produced by the inverter controller 50 is a collection of switching points, or times, which is used to operate individual transistor switches of the inverter 40. Accordingly, when one knows the current and voltage of the POR 80, one can then determine the nature of the loads 70 (e.g., real and reactive power components and balance of the loads) and can select or generate a suitable pattern to control the inverter 40 to minimize distortion at the POR 80.

Figure 4:
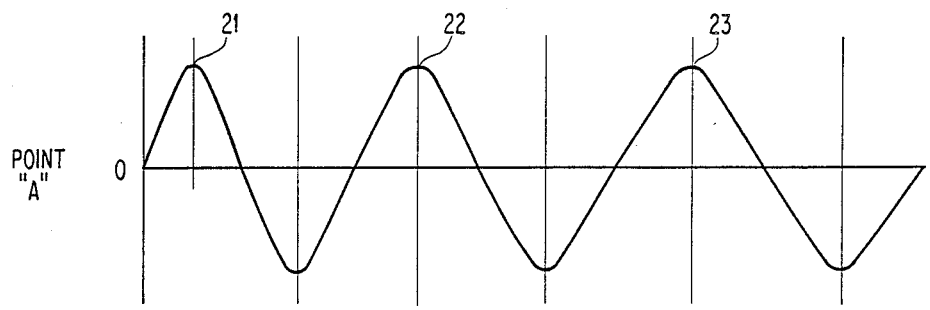
FIG. 4 is a graph representing an irregular frequency a.c. signal taken at point "A" in FIG. 1.

The subject invention is an extension of the known technique for inverter control described above. In that control technique, it was implicitly assumed that outputs from the rectifier 30 would be pure d.c. voltages, having no variations whatsoever. More particularly, FIG. 4 represents a waveform taken at point "A" of FIG. 1. The waveform is a wild frequency a.c. signal produced by generator 20. The distance from peak 21 to peak 22 is illustrated to show that the distance from peak 21 to peak 22 is less than the distance from peak 22 to peak 23. This is intended to illustrate that the waveform represented in FIG. 4 is a variable frequency. Aircraft electrical loads are often sensitive to changes in frequency and are therefore unable to use the wild frequency produced by the generator as shown in FIG. 4. The waveform represented in FIG. 4 is rectified in the rectifier shown in FIG. 1. Output from the rectifier 30, as previously mentioned is in the form of a d.c. link consisting of a positive d.c. rail 31 and a negative d.c. rail 33 leading to the inverter 40.

Figure 5:
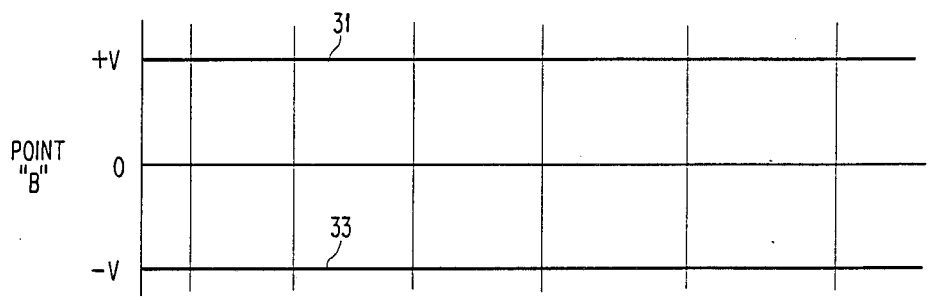
FIG. 5 is a graph representing a d.c. signal taken at point "B" of FIG. 1.

FIG. 5 represents an assumed waveform taken at point "B" of FIG. 1 in a prior art system not including the subject invention. Accordingly, FIG. 5 shows a positive rail voltage 31 and a negative rail voltage 33. The assumption in the prior art was that the output from the rectifier 30 was an ideal, unvarying d.c. voltage; i.e., a "stiff" d.c. link.

Figure 6:
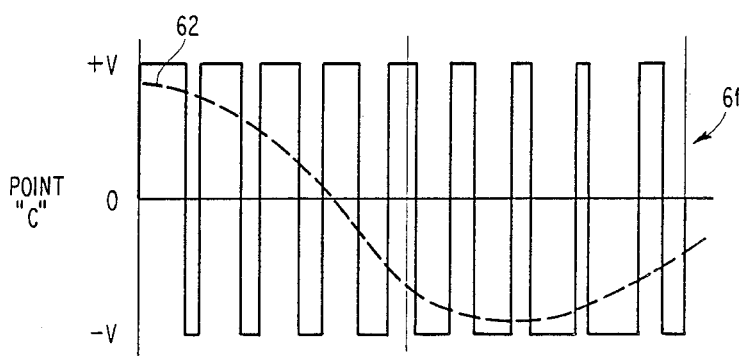
FIG. 6 is a graph representing a prior art controlled inverter output pattern signal taken at point "C" of FIG. 1 under an unbalanced load condition.

FIG. 6 represents a prior art inverter control output signal indicated generally as 61 and taken at point "C" in FIG. 1. The signal 61 comprises a plurality of switching points which define positive and negative pulses of varying widths. The pulses direct negative pulses switches in the inverter 40 of FIG. 1 to modulate the d.c. link to produce an a.c. waveform when filtered. That waveform is approximately sinusoidal as represented by dotted line 62 corresponding to signal 61. During operation, the VSCF system must supply power to loads having different real and reactive power requirements. Accordingly, the inverter controller 50 of FIG. 1 must store, or generate in real time, PWM patterns which are optimized to provide minimum harmonic distortion to the POR 80 for particular operating conditions; i.e., particular real or reactive power loads. The different real and reactive power components of the loads are sensed at the POR 80 as shown in FIG. 1. In response to signals sensed at the POR 80, the inverter controller 50 provides an inverter control output signal which is used to the control switches within the inverter 40. The unmodified signal 61 is applied to the unvarying or "stiff" d.c. link to produce a constant frequency a.c. waveform.

Figure 7:
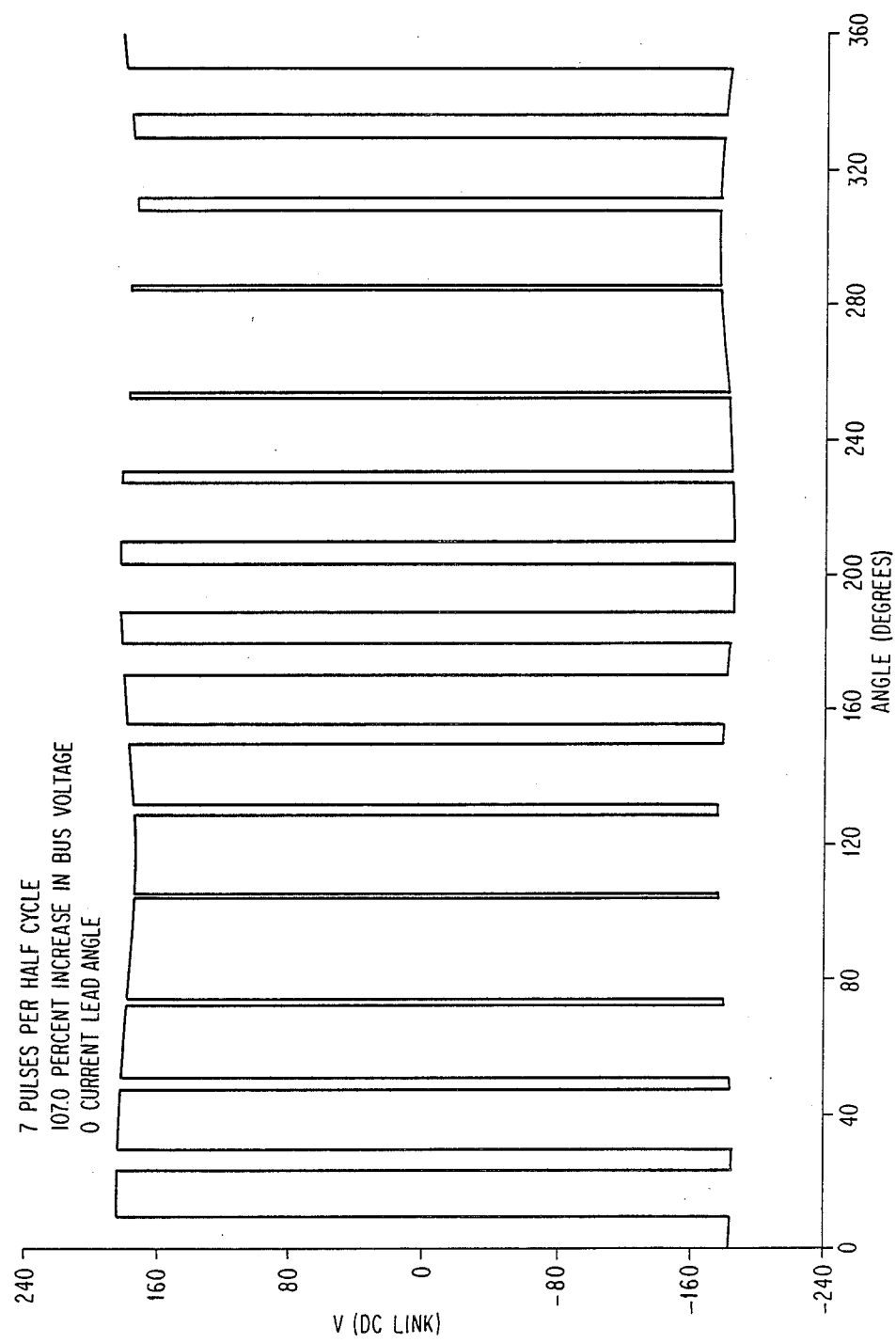
FIG. 7 is a graph showing the waveform to Fourier analysis showing the harmonic distortion due to the d.c. link.

FIG. 7 is a graph of a waveform to Fourier analysis showing the effect of d.c. link ripple. In FIG. 7, the ordinate represents the voltages on the d.c. link, and the abscissa represents the switching angle over 360°. There are seven pulses defined by seven switching angles per quarter cycle (with half cycle symmetry) in this example. It will be observed in FIG. 7 that voltages on the d.c. link vary over the full switching cycle. This variability and the variation in the positioning of the switching events, if not otherwise accounted for, will produce harmonic distortion of the output of the inverter.

Figure 8:
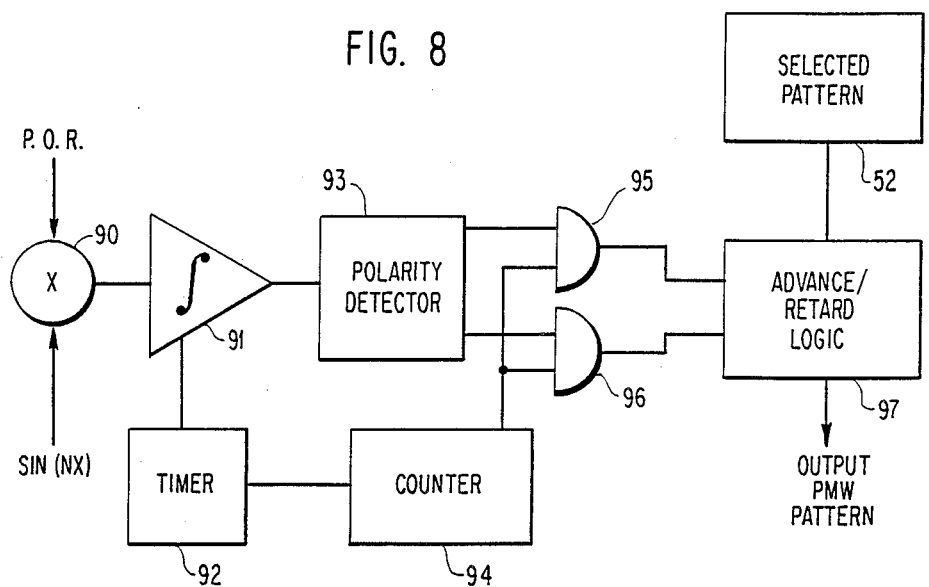
FIG. 8 is a block diagram showing the system control logic and signal flow of the invention.
Figure 9:
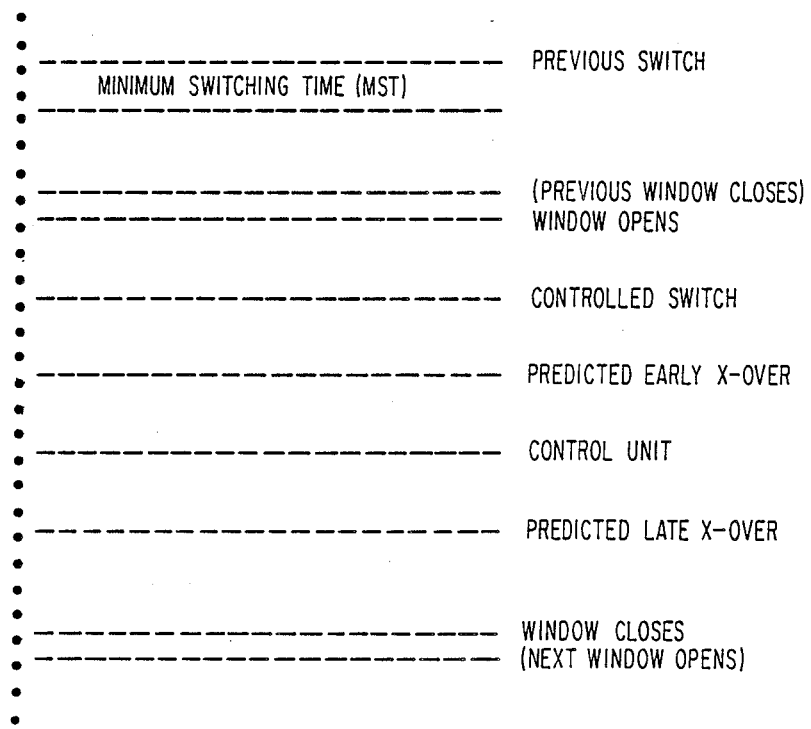
FIG. 9 is a timing diagram of the logic sequence of the logic shown in FIG. 7.

FIG. 8 shows the system control logic and signal flow for a single switching angle of a single phase. In our example, there are seven switching angles per phase, but the following discussion is limited to a single angle of one phase. It will therefore be appreciated that the following discussion applies equally to all the angles of the set.

In FIG. 8, the voltage signal for the harmonic of interest, sin nx, is multiplied by a signal representing the POR voltage in multiplier 90. The output of multiplier 90 is integrated in integrator 91 over the period of the fundamental under the control of timer 92 providing the basic computation of the Fourier transform for the harmonic of interest. The integrated product is referred to as An(x). Integration forming An(x) is started at time $x_0$ by timer 92, where $x_0$ is the predicted time of firing for the angle under consideration. The signal An(x) integrated over the period of the fundamental will equal zero or whatever value is used in the original pattern determination.

The signal An(x) is applied to polarity detector 93. The outputs of the polarity detector 93 are generated if the output of integrator 91 is either positive or negative. No output is generated if the output of the integrator 91 is zero. The output indicating a positive output of integrator 91 is supplied to AND gate 95, while the output indicating a negative output of integrator 91 is supplied to AND gate 96. AND gates 95 and 96 are enabled by a counter 94 under the control of timer 92. Counter 94 provides an output corresponding to the period of the fundamental. Thus, the AND gates 95 and 96 are both enabled at the end of each integration period. If no adjustment to the PWM pattern is required, i.e., there is a zero output from the integrator 91, neither of the AND gates will provide an output. If, however, adjustment is necessary, one or the other of AND gates 95 and 96 will provide an output.

Adjustment of the selected pattern from selection logic 52 is made by advance/retard logic 97. If, for example, the output of integrator 91 is positive at the end of the integration period, there will be an output from AND gate 95 which causes the advance/retard logic 97 to advance the PWM pattern. If, on the other hand, the output of integrator 91 is negative at the end of the integration period, there will be an output from AND gate 96 which causes the advance/retard 97 to retard the PWM pattern.

The circuit shown in FIG. 8 may be replicated to control as many harmonics as desired for each switching event. Thus, if there are seven switching events and seven harmonics are to be controlled, then there would be seven multipliers, integrators and inverters and seven cross-over detectors per phase. In a practical implementation, circuit elements may be shared or multiplexed realizing economies in construction. For example, three channels of multiplexed analog to-digital (A/D) conversion allow for monitoring harmonic signals of each phase. Multiplication of the harmonic signal of interest can be effected by supplying the POR voltage to the A/D converter as the reference voltage. The multiplexed outputs of the A/D conversion and multiplication process are then stored in separate accumulating registers which perform the integration function.

From the foregoing, it will be appreciated that the present invention is effective to generate switching signals in real time and accounts for variations which occur in system performance. The process used in the generation of the switching events implements a "quick" Fourier transform which allows the real time operation. Thus, while the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. An improved control for a pulse width modulated inverter which takes into account harmonic distortion produced by a d.c. link which is not constant comprising:
   a calculator which performs a Fourier transform computation for each output harmonic of interest; and
   a detector connected to said calculator and selecting a time for a switching event based on said computation going to zero during an expected time period.

2. The improved control recited in claim 1 wherein said calculator comprises:
   a multiplier for multiplying a voltage signal for a harmonic of interest by a reference voltage to produce a product signal; and
   an integrator integrating said product signal over a time period equal to a fundamental period of an output of said inverter, said integrator producing an integrated product signal.

3. The improved control recited in claim 2 wherein said detector comprises:
   a polarity detector connected to receive said integrated product signal and generating a first output if a polarity of said integrated product signal is positive and a second output if a polarity of said integrated product signal is negative; and
   selection means responsive to said first or said second outputs of said polarity detector for respectively advancing or retarding a switching time.

4. An inverter system comprising:
   a source of variable frequency power;
   a rectifier connected to said source of variable frequency power and providing positive and negative voltages on respective rails;
   an inverter connected to said rails and selectively switching said positive and negative voltages to provide a pulse width modulated output;
   a filter connected to inverter said pulse width modulated output to produce a generally sinusoidal output;
   one or more loads connected to said filter and operating on said sinusoidal output;
   sensing means connected between said filter and said one or more loads for providing outputs of sensed parameters of said sinusoidal output;
   an inverter controller responsive to said sensed parameters and connected to said inverter to control switching times of said inverter to provide said pulse width modulated output, said inverter including a calculator which performs a Fourier transform computation for each output harmonic of interest, and a detector connected to said calculator and selecting a time for a switching event based on said computation going to zero during an expected time period.

5. The inverter system recited in claim 4 wherein said sensed parameters include harmonics of a fundamental of said sinusoidal output and a reference voltage and said calculator comprises:
   a multiplier for multiplying a voltage signal for a harmonic of interest by said reference voltage to produce a product signal; and
   an integrator integrating said product signal over a time period equal to a fundamental period of an output of said inverter, said integrator producing an integrated product signal.

6. The inverter system recited in claim 5 wherein said detector comprises:
   a polarity detector connected to receive said integrated product signal and generating a first output if a polarity of said integrated product signal is positive and a second output if a polarity of said integrated product signal is negative; and
   selection means responsive to said first or said second outputs of said polarity detector for respectively advancing or retarding a switching time.

7. The inverter system recited in claim 6 wherein said source of variable frequency power and said inverter are three phase devices, said multiplier being an analog to digital converter referenced to said reference voltage and having each of said three phases multiplexed to said analog to digital converter.

8. A technique for determining switching angles in real time for a pulse width modulated inverter comprising the steps of:
   for a controlled selected harmonic, calculating a Fourier transform for that harmonic; and
   selecting switching times to minimize said selected harmonic.

9. The technique recited in claim 8 wherein the step of calculating is performed by the steps of:
   multiplying a voltage signal for a harmonic of interest by a reference voltage to produce a product signal; and
   integrating said product signal over a time period equal to a fundamental period of an output of said inverter, said integrator producing an integrated product signal.

10. The technique recited in claim 9 wherein said step of selecting is performed by the steps of:
    detecting a polarity of said integrated product signal and generating a first output if the polarity is positive and a second output if the polarity signal is negative; and
    advancing or retarding a switching time depending on whether said first or said second output is generated.

* * * * *